United States Patent [19]

Khan et al.

[11] Patent Number: 5,534,040
[45] Date of Patent: Jul. 9, 1996

[54] PARTIAL OXIDATION OF PARTIALLY LIQUIFIED PLASTIC MATERIALS

[75] Inventors: Motasimur R. Khan, Wappinger Falls; Christine C. Albert, Peekskill; Stephen J. DeCanio, Montgomery, all of N.Y.

[73] Assignee: Texaco Inc., White Plains, N.Y.

[21] Appl. No.: 415,153

[22] Filed: Mar. 31, 1995

Related U.S. Application Data

[63] Continuation of Ser. No. 130,921, Oct. 4, 1993, abandoned.

[51] Int. Cl.$^6$ ........................................... C10J 3/46
[52] U.S. Cl. .................... 48/197 R; 48/209; 48/DIG. 7; 252/373; 585/241
[58] Field of Search ..................... 48/197 R, 206, 48/209, DIG. 7; 252/373; 585/240, 241; 588/213, 216, 220, 226

[56] References Cited

U.S. PATENT DOCUMENTS

| | | | |
|---|---|---|---|
| 4,108,730 | 8/1928 | Chen et al. | 585/291 |
| 4,443,320 | 4/1984 | Stelloccio | 48/147 R |
| 4,468,376 | 8/1984 | Suggett | 423/358 |
| 4,642,401 | 2/1987 | Coener et al. | 585/241 |
| 5,232,487 | 8/1993 | Rabe et al. | 75/414 |
| 5,364,996 | 11/1994 | Castagnoli et al. | 580/241 |

FOREIGN PATENT DOCUMENTS

| | | | |
|---|---|---|---|
| 2352637 | 3/1978 | France | 585/241 |
| 2922553 | 12/1979 | Germany | 585/241 |
| 3313470 | 10/1984 | Germany | 585/241 |

*Primary Examiner*—Peter Kratz
*Attorney, Agent, or Firm*—George J. Darsa

[57] ABSTRACT

A process for upgrading plastic material containing inorganic filler or reinforcement material for use as feedstock in a partial oxidation gas generator for the production of raw synthesis gas, fuel gas, or reducing gas. The plastic material is granulated and partially liquefied by heating in a closed autoclave at a temperature in the range of about 400° F. to 495° F. and a pressure in the range of about 150 psig to 750 psig while the plastic material is in contact with a pumpable hydrocarbonaceous liquid solvent. A pumpable slurry is thereby produced comprising solubilized plastic, unsolubilized plastic, hydrocarbonaceous liquid solvent, separated inorganic material and unseparated inorganic material. After removing the separated inorganic material, the remainder of the slurry is then reacted by partial oxidation to produce said raw synthesis gas, fuel gas or reducing gas.

12 Claims, No Drawings

PARTIAL OXIDATION OF PARTIALLY LIQUIFIED PLASTIC MATERIALS

FIELD OF THE INVENTION

This application is a continuation of application Ser. No. 08/130,921 filed Oct. 4, 1993, now abandoned.

This invention relates to an environmentally safe method for disposing of scrap plastic materials. More particularly, it pertains to a process for upgrading scrap plastic materials to produce a pumpable slurry of hydrocarbonaceous liquid solvent and partially liquefied scrap solid carbonaceous plastic-containing material and introducing said slurry into a partial oxidation gasifier for the production of synthesis gas, reducing gas, or fuel gas.

Scrap plastics are solid organic polymers and are available in such forms as sheets, extruded shapes, moldings, reinforced plastics, laminates, and foamed plastics. About 60 billion pounds of plastics are sold in the United States each year. For example, automobiles are increasingly being manufactured containing more plastic parts. A large part of these plastic materials wind up as scrap plastics in landfills. Although plastics account for only a small portion of the waste dumped in landfills i.e. about 7 wt. % and about 20 percent by volume, burying them is getting increasingly difficult. The cost of landfilling this material in 1993 is between $12 to $100 per ton (excluding shipping costs); and this cost is rising. Landfills are not universally viewed as an acceptable, or even a tolerable option for the disposal of plastic materials. Due to the combined effects of the unpopularity of existing facilities and the need for land to allow normal growth of populations, new landfills have been all but banned in many parts of the world. Existing facilities are also facing finite limits as to how long they may continue to function. Also, toxic wastes from buried plastics seep into and pollute underground streams which are commonly the source of our fresh water. Further, on-site burning or incineration which are alternative disposal methods are in disfavor because they generate heavy air pollution from noxious gases and soot. With respect to recycling plastics, it has been economically feasible to recycle only about 1 wt. % of the scrap plastics. It is obvious from the aforesaid that the disposal of scrap plastics is one of the nation's most pressing environmental problems.

Advantageously by the subject environmentally acceptable process, a wide range of plastic feedstocks are partially liquefied for volume reduction and comparatively low cost disposal by partial oxidation. Useful synthesis gas, reducing gas or fuel gas is produced. Further, the relatively medium heating value of the plastic material e.g. greater than about 3,000 Btu/lb is made available for heating internal process streams or producing by-product hot water or steam.

SUMMARY OF THE INVENTION

This invention relates to an environmentally acceptable process for the partial oxidation of a pumpable slurry of hydrocarbonaceous liquid solvent and partially liquefied solid carbonaceous plastic material containing inorganic filler or reinforcement material; wherein synthesis gas, reducing gas, or fuel gas is produced by said process comprising the steps of:

(1) granulating plastic material containing inorganic filler or reinforcement material;

(2) partially liquefying the granulated plastic material from (1) by heating in a closed autoclave at a temperature in the range of about 400° F. to 495° F. and a pressure in the range of about 150 psig to 750 psig while said plastic material is in contact with a pumpable hydrocarbonaceous liquid solvent in the amount of about 1 to 5 parts by wt. of said hydrocarbonaceous liquid per part by weight of plastic material; wherein said heating is continued until a pumpable slurry mixture is produced which when cooled to room temperature and pressure comprises the following ingredients in weight percent:

a. solubilized plastic 20 to 30,
b. unsolubilized plastic 5 to 15,
c. hydrocarbonaceous liquid solvent 45 to 55,
d. separated inorganic material 1 to 15,
e. unseparated inorganic material 5 to 15;

(3) separating said separated inorganic material (2) (d) from the remainder of said slurry mixture in (2); and (4) reacting by partial oxidation with a free-oxygen containing gas in the presence of a temperature moderator the remainder of said slurry mixture from (3) to produce raw synthesis gas, fuel gas, or reducing gas.

DESCRIPTION OF THE INVENTION

Scrap plastics are disposed of by the process of the subject invention without polluting the nation's environment. Simultaneously, useful by-product nonpolluting synthesis gas, reducing gas, fuel gas and nonhazardous slag are produced.

The scrap plastic materials which are processed as described herein into a pumpable slurry fuel feed for a partial oxidation gas generator include at least one solid carbonaceous thermoplastic or thermosetting material that contains associated inorganic matter e.g. fillers and reinforcement material. Sulfur is also commonly found in scrap plastics. Scrap plastic materials may be derived from obsolete equipment, household containers, packaging, industrial sources and junked automobiles. The mixture of plastics is of varying age and composition. With the presence of varying amounts of incombustible inorganic matter compounded in the plastic as fillers, catalysts, pigments and reinforcing agents, recovery of the plastic material is generally impractical. Further, complete combustion can release toxic-noxious components including volatile metals and hydrogen halides. Associated inorganic matter in the scrap solid carbonaceous plastic includes fillers such as titania, talc, clays, alumina, barium sulfate and carbonates. Catalysts and accelerators for thermosetting plastics include tin compounds for polyurethanes, and cobalt and manganese compounds for polyesters. Dyes and pigments such as compounds of cadmium, chromium, cobalt, and copper; nonferrous metals such as aluminum and copper in plastic coated wire cuttings; metal films; woven and nonwoven fiber glass, graphite, and boron reinforcing agents; steel, brass, and nickel metal inserts; and lead compounds from plastic automotive batteries. Other heavy metals e.g. cadmium, arsenic, barium, chromium, selenium, and mercury may be also present. The inorganic constituents are present in the solid carbonaceous plastic-containing material in the amount of about a trace amount to about 60 wt. % of said solid carbonaceous plastic-containing material, such as about 1 to 20 wt %. The scrap plastic material may be in the form of sheets, extruded shapes, moldings, reinforced plastics, and foamed plastics.

The slurrying medium comprises a pumpable liquid hydrocarbonaceous solvent in the amount of about 30 to 90 wt. %. By definition, the term liquid hydrocarbonaceous solvent as used herein to describe suitable liquid solvents is a liquid hydrocarbonaceous fuel selected from the group consisting of liquefied petroleum gas, petroleum distillates and residues, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof. Waste hydrocarbon motor oil may also be used as a liquid solvent. Hydrocarbon oils having the following properties are suitable: initial atmospheric boiling point, greater than 500° F.; Neutralization No., mg KOH/g 0.70 to 1.0; and Aniline point ° F. 100 to 110. Other suitable oils comply with ASTM specification D2226, Types 101 and 102. The expression "A and/or B" is used herein in its usual manner and means A or B or A and B.

FIG. 1 gives a breakdown of 1991 sales in the United States of solid carbonaceous plastics.

FIG. 1

| Material | Million lbs. 1991 |
| --- | --- |
| Acrylobutadienestyrene (ABS) | 1,125 |
| Acrylic | 672 |
| Alkyd | 315 |
| Cellulosic | 840 |
| Epoxy | 428 |
| Nylon | 536 |
| Phenolic | 2,556 |
| Polyacetal | 140 |
| Polycarbonate | 601 |
| Polyester, thermoplastic | 2,549 |
| Polyester, unsaturated | 1,081 |
| Polyethylene, high density | 9,193 |
| Polyethylene, low density | 12,143 |
| Polyphenylene-based alloys | 195 |
| Polypropylene and copolymers | 8,155 |
| Polystyrene | 4,877 |
| Other styrenes | 1,180 |
| Polyurethane | 2,985 |
| Polyvinylchloride and copolymers | 9,130 |
| Other vinyls | 120 |
| Styrene acrylonitrile (SAN) | 117 |
| Thermoplastic elastomers | 584 |
| Urea and melamine | 1,467 |
| Others | 345 |
| Total | 60,598 |

The solid carbonaceous plastic-containing material that contains associated inorganic matter e.g. filler or reinforcement material, has a higher heating value (HHV) in the range of about 3000 to 19,000 BTU per lb of solid carbonaceous plastic-containing material. The plastic-containing material is granulated by conventional means to a maximum particle dimension of about ¼", such as about ⅛". Granulating is the preferred method for reducing the size of plastic. Any conventional plastic granulator and mill may be used. For example, a granulator will readily shred/grind solid plastic pieces to a particle size which passes through ASTM E 11 Alterative Sieve Designation ¼" or less. A mill can take the product from the granulator (i.e., −¼") and readily convert it to smaller sizes (−⅛" or less), such as ASTM E11 Alternative Sieve Designation No. 7. For example, a suitable granulator and mill are made by Enteleter Inc., 251 Welton St., Hamden, CT 06517. The ash content for an as-received granulated sample of automotive crusher plastic residue (ACR) is 58.2 wt %.

The granulated solid carbonaceous plastic-containing material is mixed together with a liquid slurrying medium comprising a liquid hydrocarbonaceous solvent to produce a pumpable slurry having a solids content in the range of about 15 to 50 wt.% and having a minimum higher heating value (HHV) of about 4500 BTU/lb. of slurry.

The pumpable slurry is introduced into a closed autoclave where the granulated plastic material is directly contacted and heated by said pumpable hydrocarbonaceous liquid solvent which is present in the amount of about 1 to 5 parts by wt. of said hydrocarbonaceous liquid solvent per part by wt. of plastic material. The temperature in the autoclave is in the range of 400° F. to 495° F. The pressure in the autoclave is in the range of 150 psig to 750 psig. Under these conditions condensate formation due to cracking and residue formation due to coking are avoided. Liquefaction of a portion of the plastic by contact with the hot hydrocarbonaceous liquid solvent takes place over a period of time in the range of about 20 min. to 6.0 hrs, such as about 30 minutes. The partial liquefaction of the granulated plastic is continued until a pumpable slurry is produced which when cooled to room temperature and pressure comprises the following ingredients in wt.%:

| | |
| --- | --- |
| a. solubilized plastic | 20 to 30 |
| b. unsolubilized plastic | 5 to 15 |
| c. hydrocarbonaceous liquid solvent | 45 to 55 |
| d. separated inorganic material | 1 to 15 |
| e. unseparated inorganic material | 5 to 15 |

The solubilized plastic is that portion of the granulated plastic material that is liquefied by contact with hydrocarbonaceous liquid solvents. The unsolubilized plastic is that portion of the granulated plastic that remains undissolved after said solvent treatment. The separated inorganic material is that portion of the inorganic material produced by the solvent liquefaction treatment of the granulated plastic material that may be easily separated from the remainder of the slurry by settling, screening, filtering, or centrifuging. The density of the separated inorganic material is greater than 1.2. Typical separated inorganic compounds are selected from the group consisting of silica, alumina, calcium carbonate, and mixtures thereof. Also included are the oxides and/or sulfides of Na, Ca, Mg, Fe, and mixtures thereof. In one embodiment, at least a portion of the separated inorganic material is recycled to the autoclave for additional heating in said hydrocarbonaceous liquid solvent.

Unseparated inorganic material is that portion of the inorganic material produced by the solvent liquefaction treatment of the granulated plastic material that remains combined in the slurry and cannot be easily separated from the slurry by settling, screening, filtering, or centrifuging. Typical unseparated inorganic material includes mixtures of the oxides and/or sulfides of the following elements: Al, Ba, Ca, Cu, Fe, K, Mg, Mn, Ni, P, Pb, Si, Sr and Ti. The particle size of the unseparated inorganic material is less than 0.2 mm., which is less than the particle size of the separated inorganic material.

The pumpable slurry of granulated solid carbonaceous plastic-containing material and liquid slurrying medium, a temperature moderator e.g. $H_2O$, $CO_2$, and a stream of free-oxygen containing gas are introduced into the reaction zone of a free-flow unobstructed downflowing vertical refractory lined steel wall pressure vessel where the partial oxidation reaction takes place for the production of synthesis gas, reducing gas, or fuel gas. A typical gas generator is shown and described in coassigned U.S. Pat. No. 3,544,291, which is incorporated herein by reference.

A two, three or four stream annular type burner, such as shown and described in coassigned U.S. Pat. Nos. 3,847, 564, and 4,525,175, which are incorporated herein by reference, may be used to introduce the feedstreams into the partial oxidation gas generator. With respect to U.S. Pat. No. 3,847,564, free-oxygen containing gas, for example in admixture with steam, may be simultaneously passed through the central conduit 18 and outer annular passage 14 of said burner. The free-oxygen containing gas is selected from the group consisting of substantially pure oxygen i.e. greater than 95 mole % $O_2$, oxygen-riched air i.e. greater than 21 mole % $O_2$, and air. The free-oxygen containing gas is supplied at a temperature in the range of about 100° F. to 1000° F. The pumpable slurry of granulated solid carbonaceous plastic-containing material and hydrocarbonaceous liquid solvent is passed into the reaction zone of the partial oxidation gas generator by way of the intermediate annular passage 16 at a temperature in the range of about ambient to 650° F.

The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator such as water, steam, or $CO_2$ directly into the reaction zone.

The relative proportions of fuels, free-oxygen containing gas and temperature moderator in the feedstreams to the gas generator are carefully regulated to convert a substantial portion of the carbon in the slurry, e.g., up to about 90% or more by weight, to carbon oxides; and to maintain an autogenous reaction zone temperature in the range of about 1800° F. to 3500° F. Preferably the temperature in the gasifier is in the range of about 2400° F. to 2800° F., so that molten slag is produced. The pressure in the partial oxidation reaction zone is in the range of about 1 to 30 atmospheres. Further, the weight ratio of $H_2O$ to carbon in the feed is in the range of about 0.2–3.0 to 1.0, such as about 0.5–2.0 to 1.0. The atomic ratio of free-oxygen to carbon in the feed is in the range of about 0.8–1.5 to 1.0, such as about 0.9–1.2 to 1.0. By the aforesaid operating conditions, a reducing atmosphere comprising $H_2$+CO is produced in the reaction zone along with nontoxic slag.

The dwell time in the partial oxidation reaction zone is in the range of about 1 to 15 seconds, and preferably in the range of about 2 to 8 seconds. With substantially pure oxygen feed to the gas generator, the composition of the effluent gas from the gas generator in mole % dry basis may be as follows: $H_2$ 10 to 60, CO 20 to 60, $CO_2$ 5 to 60, $CH_4$ nil to 5, $H_2S$+COS nil to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ nil to 2, $H_2S$+COS nil to 3, $N_2$ 45 to 80, and Ar 0.5 to 1.5. Unconverted carbon, ash, or molten slag are contained in the effluent gas stream. Depending on the composition and use, the effluent gas stream is called synthesis gas, reducing gas, or fuel gas. For example, synthesis gas comprises mixtures of $H_2$+CO that can be used for chemical synthesis; reducing gas is rich in $H_2$+CO and is used in reducing reactions; and fuel gas comprises mixtures of $H_2$+CO, and may also includes $CH_4$. Advantageously, in the extremely hot reducing atmosphere of the gasifier, the toxic elements in the inorganic matter in the solid carbonaceous plastic-containing material are captured by the noncombustible constituents present and converted into nontoxic nonleachable slag. This permits the nontoxic slag to be sold as a useful by-product. For example, the cooled slag may be ground or crushed to a small particle size e.g. less than ⅛" and used in road beds or building blocks.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The cooled gas stream may be cleaned and purified by conventional methods. For example, reference is made to coassigned U.S. Pat. No. 4,052,176, which is included herein by reference for removal of $H_2S$, COS, and $CO_2$. Advantageously, when gasifying plastics that contain halides such as polyvinylchloride, polytetrafluoroethylene, by partial oxidation, the halide is released as hydrogen halide (i.e. HCl, HF) and is scrubbed out of the synthesis gas with water containing ammonia or other basic materials. Plastics that contain bromine-containing fire retardants may be similarly treated. Reference is made to coassigned U.S. Pat. No. 4,468,376 which is incorporated herein by reference.

The following examples illustrate the subject invention and should not be construed as limiting the scope of the invention.

EXAMPLES

Example 1

4 tons per day of a mixture comprising several types of plastic that are found in automobiles including unfilled, filled, and reinforced plastics from the following resins: polystyrene, polyamide, polyurethane, polyvinylchloride, polypropylene, and others are shredded to a particle dimension of less than about ⅛" and mixed with 4 tons per day of waste hydrocarbon motor oil having an initial atmospheric boiling point in the range of about 250° F. to 500° F. The ultimate chemical analysis of a typical shredded mixture of plastics is shown in Table I. The chemical analysis of the ash in the mixture of plastics is shown in Table II.

TABLE I

Dry Analysis of Mixture of Plastics In Example 1.

| | Weight Percent |
|---|---|
| C | 23.8 |
| H | 4.2 |
| N | 0.9 |
| S | 0.5 |
| O | 12.3 |
| Ash | 58.3 |

TABLE II

Chemical Analysis of the Ash Present In the Mixture of Plastics In Example 1.

| | Wt. % |
|---|---|
| $SiO_2$ | 33.20 |
| $Al_2O_3$ | 6.31 |
| $Fe_2O_3$ | 22.00 |
| CaO | 29.20 |
| MgO | 0.94 |
| $Na_2O$ | 1.27 |
| $K_2O$ | 0.43 |
| $TiO_2$ | 0.89 |
| $P_2O_3$ | 0.92 |
| $Cr_2O_3$ | 0.28 |

TABLE II-continued

Chemical Analysis of the Ash Present
In the Mixture of Plastics
In Example 1.

| | Wt. % |
|---|---|
| ZnO | 2.31 |
| PbO | 0.09 |
| BaO | 0.80 |
| CuO | 0.89 |
| NiO | 0.47 |

The aforesaid pumpable aqueous slurry of plastics and waste oil is partially liquefied in a closed autoclave at a temperature of 475° F. and a pressure of 500 psig for 30 minutes. The pumpable slurry from the autoclave is filtered to remove separable inorganic material and the remaining portion is reacted with about 7 tons per day of oxygen gas by partial oxidation in a conventional free flow noncatalytic gas generator at a temperature of about 2400° F. and a pressure of about 500 psig. Synthesis gas comprising $H_2+CO$ is produced along with about 3 tons of slag. Upon cooling, the slag is a coarse, glassy nonleachable material. If however, the same mixture of plastics were fully combusted in air, the slag may contain toxic elements, e.g. chromium in a leachable form.

Other modifications and variations of the invention as hereinbefore set forth may be made without departing from the spirit and scope thereof, and therefore, only such limitations should be imposed on the invention as are indicated in the appended claims.

We claim:

1. A partial oxidation process comprising:

(1) granulating solid organic plastic material in the form of sheets, extruded shapes, moldings, reinforced plastics, laminates and foamed plastics, said plastic material containing inorganic filler or reinforcement material;

(2) partially liquefying the granulated plastic material from (1) by heating in a closed autoclave at a temperature in the range of about 400° F. to 495° F. and a pressure in the range of about 150 psig to 750 psig while said plastic material is in contact with a pumpable hydrocarbonaceous liquid solvent in the amount of about 1 to 5 parts by wt. of said hydrocarbonaceous liquid per part by weight of plastic material; wherein said heating is continued until a pumpable slurry is produced which when cooled to room temperature and pressure comprises the following ingredients in weight percent:

| | |
    |---|---|
    | a. solubilized plastic | 20 to 30, |
    | b. unsolubilized plastic | 5 to 15, |
    | c. hydrocarbonaceous liquid solvent | 45 to 55, |
    | d. separated inorganic material | 1 to 15, |
    | e. unseparated inorganic material | 5 to 15; |

(3) separating said separated inorganic material (2) (d) from the remainder of said slurry in (2); and (4) forwarding the remainder of said slurry after separation in (3) to a partial oxidation zone, and reacting by partial oxidation with a free-oxygen containing gas in the presence of a temperature moderator the remainder of said slurry to produce raw synthesis gas, fuel gas, or reducing gas, and a substantially non-toxic non-leachable slag.

2. The process of claim 1 wherein the granulated solid carbonaceous plastic material from (1) is mixed with the liquid hydrocarbonaceous solvent from (2) to produce the pumpable slurry which is introduced into the autoclave in (2).

3. The process of claim 1 wherein said pumpable hydrocarbonaceous liquid solvent is selected from the group consisting of petroleum distillates and residues, crude petroleum, asphalt, gas oil, residual oil, tar sand oil and shale oil, coal derived oil, aromatic hydrocarbons, coal tar, cycle gas oil from fluid-catalytic-cracking operations, furfural extract of coker gas oil and mixtures thereof.

4. The process of claim 1 wherein said pumpable hydrocarbonaceous liquid solvent meets ASTM Specification D2226, Types 101 and 102.

5. The process of claim 1 wherein said hydrocarbonaceous liquid solvent is a hydrocarbon oil having the following properties: initial atmospheric boiling point greater than 500° F., Neutralization No., mg KOH/g 0.70 to 1.0, and aniline point 100° F. to 110°.

6. The process of claim 1 wherein said plastic material is selected from the group consisting of polyesters, polyurethane, polyamide, polystyrene, cellulose acetate, polypropylene, and mixtures thereof.

7. The process of claim 1 where in (1) said plastic material is granulated to a particle size which passes through ASTM E11 Alternative Sieve Designation No. 7 or less.

8. The process of claim 1 where in (2) said heating takes place for a period in the range of about 20 minutes to 6.0 hr.

9. The process of claim 1 where in (3) said separated inorganic (2) (d) material is separated from the remainder of said slurry mixture by settling, screening, or centrifuging.

10. The process of claim 1 wherein the separated inorganic material (2) (d) is selected from the group consisting of silica, alumina, calcium carbonate, the oxides and/or sulfides of iron, magnesium, calcium, and sodium, and mixtures thereof.

11. The process of claim 1 provided with the step of recycling at least a portion of the separated inorganic material (2) (d) to the autoclave in (2) for additional heating in said hydrocarbonaceous liquid solvent.

12. The process of claim 1 where in (4) said remainder of said slurry from (3) is reacted with a free oxygen containing gas by partial oxidation in a free-flow refractory lined vertical gas generator at a temperature in the range of about 1800° F. to 3500° F., a pressure in the range of about 1 to 300 atmospheres, an atomic ratio O/C in the range of about 0.8–1.5 to 1.0, and a weight ratio of $H_2O$ to carbon in the range of about 0.2–3.0 to 1.0, to produce a hot raw effluent gas stream comprising $H_2$, CO, $CO_2$, $H_2O$, $H_2S$, COS, and optionally $N_2$.

* * * * *